(12) United States Patent
Mozer

(10) Patent No.: US 9,916,832 B2
(45) Date of Patent: Mar. 13, 2018

(54) USING COMBINED AUDIO AND VISION-BASED CUES FOR VOICE COMMAND-AND-CONTROL

(71) Applicant: Sensory, Incorporated, Santa Clara, CA (US)

(72) Inventor: Todd F. Mozer, Los Altos Hills, CA (US)

(73) Assignee: Sensory, Incorporated, Santa Clara, CA (US)

( * ) Notice: Subject to any disclaimer, the term of this patent is extended or adjusted under 35 U.S.C. 154(b) by 3 days.

(21) Appl. No.: 15/047,504

(22) Filed: Feb. 18, 2016

(65) Prior Publication Data

US 2017/0243581 A1 Aug. 24, 2017

(51) Int. Cl.
| | |
|---|---|
| *G10L 21/00* | (2013.01) |
| *G10L 15/25* | (2013.01) |
| *G10L 15/22* | (2006.01) |
| *G06K 9/00* | (2006.01) |

(52) U.S. Cl.
CPC .......... *G10L 15/25* (2013.01); *G06K 9/00221* (2013.01); *G10L 15/22* (2013.01); *G10L 2015/223* (2013.01); *G10L 2015/227* (2013.01)

(58) Field of Classification Search
USPC .......................... 704/246, 247, 251, 252, 275
See application file for complete search history.

(56) References Cited

U.S. PATENT DOCUMENTS

| | | | | |
|---|---|---|---|---|
| 7,515,770 | B2* | 4/2009 | Fukada | G06F 17/30253 382/209 |
| 8,384,794 | B2* | 2/2013 | Ichikawa | H04N 5/232 348/207.1 |
| 2005/0102139 | A1* | 5/2005 | Fukada | G06F 17/30253 704/235 |
| 2010/0082345 | A1* | 4/2010 | Wang | G10L 13/00 704/260 |
| 2010/0231730 | A1* | 9/2010 | Ichikawa | H04N 5/232 348/207.99 |
| 2016/0093081 | A1* | 3/2016 | Kim | G06F 3/012 345/156 |
| 2016/0148616 | A1* | 5/2016 | Takayanagi | G10L 15/32 704/235 |

* cited by examiner

*Primary Examiner* — Leonard Saint Cyr
(74) *Attorney, Agent, or Firm* — Fountainhead Law Group P.C.

(57) ABSTRACT

Techniques for leveraging a combination of audio-based and vision-based cues for voice command-and-control are provided. In one embodiment, an electronic device can identify one or more audio-based cues in a received audio signal that pertain to a possible utterance of a predefined trigger phrase, and identify one or more vision-based cues in a received video signal that pertain to a possible utterance of the predefined trigger phrase. The electronic device can further determine a degree of synchronization or correspondence between the one or more audio-based cues and the one or more vision-based cues. The electronic device can then conclude, based on the one or more audio-based cues, the one or more vision-based cues, and the degree of synchronization or correspondence, whether the predefined trigger phrase was actually spoken.

18 Claims, 4 Drawing Sheets

USING COMBINED AUDIO AND VISION-BASED CUES FOR VOICE COMMAND-AND-CONTROL

BACKGROUND

In recent years, voice command-and-control has become a popular feature on electronic devices such as smartphones, tablets, media streaming devices, smart speakers, and so on. Generally speaking, this feature allows a user to interact with the device in a hands-free manner in order to access information and/or to control operation of the device. For example, according to one implementation, the user can say a predefined trigger phrase, immediately followed by a query or command phrase. The device will typically be listening for the predefined trigger phrase (using, e.g., conventional phrase spotting/speech recognition techniques) in an always-on, low-power modality. Upon detecting an utterance of the trigger phrase, the device can cause the following query or command phrase to be processed, either locally on the device or remotely in the cloud. The device can then cause an appropriate action to be performed based on the content of the query or command phrase and can return a response to the user.

One limitation with existing voice command-and-control systems is that they rely solely on audio information to detect the trigger phrase, and thus can be confused by background noise, multiple individuals speaking simultaneously, and other factors. This, in turn, can cause such systems to generate a significant number of false accepts and/or false rejects over time. A "false accept" in this context occurs when the trigger phrase is detected although it has not been uttered, and a "false reject" occurs when the trigger phrase is not detected although it has been uttered. Accordingly, it would be desirable to have techniques that improve the accuracy of voice command-and-control.

SUMMARY

Techniques for leveraging a combination of audio-based and vision-based cues for voice command-and-control are provided. In one embodiment, an electronic device can identify one or more audio-based cues in a received audio signal that pertain to a possible utterance of a predefined trigger phrase, and identify one or more vision-based cues in a received video signal that pertain to a possible utterance of the predefined trigger phrase. The electronic device can further determine a degree of synchronization or correspondence between the one or more audio-based cues and the one or more vision-based cues. The electronic device can then conclude, based on the one or more audio-based cues, the one or more vision-based cues, and the degree of synchronization or correspondence, whether the predefined trigger phrase was actually spoken.

A further understanding of the nature and advantages of the embodiments disclosed herein can be realized by reference to the remaining portions of the specification and the attached drawings.

DETAILED DESCRIPTION

In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

1. Overview

The present disclosure describes techniques that leverage a combination of audio and vision-based cues to improve the accuracy of voice command-and-control. At a high level, a voice command-and-control system that implements these techniques can collect the following inputs at the time of monitoring for an utterance of a trigger phrase: (1) information regarding what is "heard" by the device (e.g., speech recognized by the device, the directionality of that speech, etc.); (2) information regarding what is "seen" by the device (e.g., the lip movements of recognized face(s), the direction in which those face(s) are looking, etc.); and (3) the degree of synchronization or correspondence between (1) and (2). The voice command-and-control system can then combine (1), (2), and (3) according to a probabilistic model in order to assess whether the trigger phrase (and/or a follow-on query/command phrase) was actually spoken. With these techniques, the number of false accepts and false rejects generated by the system can be significantly reduced when compared to voice command-and-control implementations that rely solely on audio information.

These and other aspects of the present disclosure are described in further detail in the sections that follow.

2. System Environment

Figure 1:
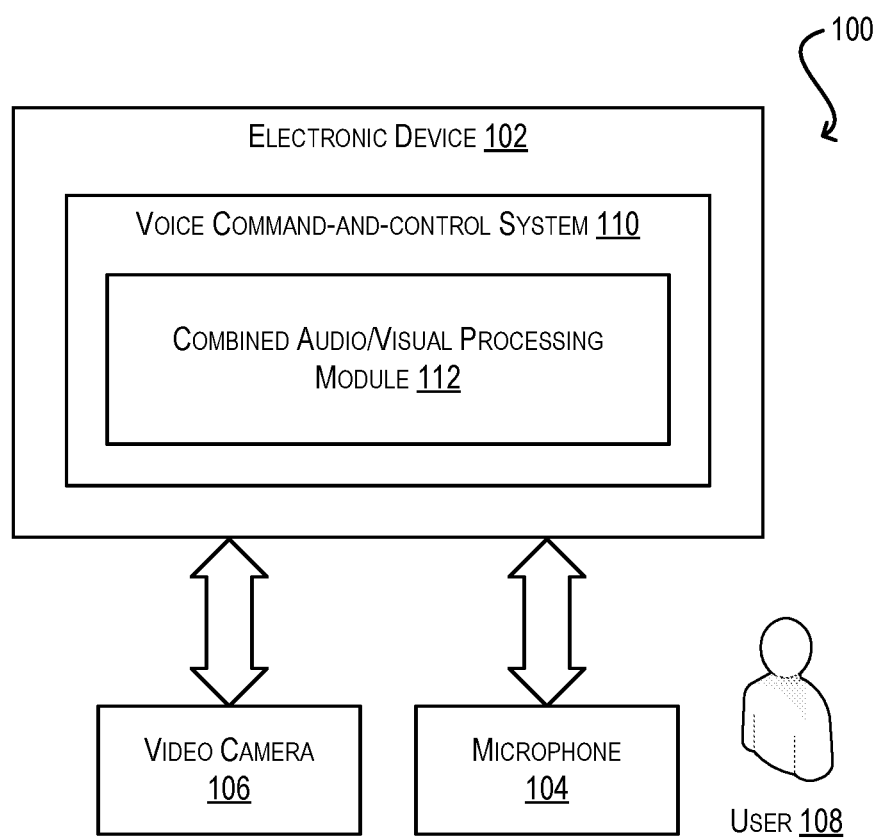
FIG. 1 depicts a system environment according to an embodiment.

FIG. 1 depicts a system environment 100 that supports the techniques of the present disclosure according to an embodiment. As shown, system environment 100 includes an electronic device 102 that is communicatively coupled with a microphone 104 and a video camera 106. In one set of embodiments, electronic device 102 can be a handheld or wearable device, such as a smartphone, a tablet, a smartwatch, or the like. In other embodiments, electronic device 102 can be a larger or stationary device or system, such as a desktop computer, a television, a media streaming device, a video game console, a public kiosk, an in-vehicle computer system, a home automation or security system, or the like.

Microphone 104 is operable for capturing audio in its surrounding environment, such as speech uttered by a device user 108. Similarly, video camera 106 is operable for capturing video of its surrounding environment, such as the face/lip movements of user 108. In one embodiment, microphone 104 and video camera 106 can be integrated directly into electronic device 102 and thus can capture audio and video in the immediate vicinity of device 102. In other embodiments, microphone 104 and/or video camera 106 may be resident in another device or housing that is separate from electronic device 102. For example, in a scenario where electronic device 102 is a home automation or security system, microphone 104 and video camera 106 may be resident in one or more fixtures that are distributed throughout a home (e.g., by the front door, in the kitchen, etc.). In this and other similar scenarios, audio data captured via microphone 104 and video data captured via video camera 106 can be relayed to electronic device 102 via an appropriate communications link (e.g., a wired or wireless link).

In addition to electronic device 102, microphone 104, and video camera 106, system environment 100 further includes a voice command-and-control system 110, which may run on electronic device 102 as shown in FIG. 1, or on another device/system such as a cloud-based server (not shown). According to one conventional approach, voice command-and-control system 110 can continuously monitor for a predefined trigger phrase by receiving audio captured via microphone 104 and processing the audio (using, e.g., a phrase spotting algorithm) in order to determine whether the trigger phrase has been spoken. If voice command-and-control system 110 detects the trigger phrase as being spoken, system 110 can recognize and process one or more query/command phrases immediately following the trigger phrase.

As noted in the Background section, one issue with detecting a trigger phrase based solely on audio information is that the accuracy of the detection process can be adversely affected by background noise and other sources of aural interference. This can lead to relatively high numbers of false accepts and/or false rejects over time. To address this and other similar problems, voice command-and-control system 110 of FIG. 1 is modified to include a combined audio/visual processing module 112. As described in further detail below, combined audio/visual processing module 112 can cause system 110 to take into account a combination of audio-based and vision-based cues at the time of monitoring for a trigger phrase. For instance, combined audio/visual processing module 112 can cause system 110 to simultaneously capture and identify (1) information regarding what is heard in the vicinity of microphone 104, and (2) information regarding what is seen in the vicinity of video camera 106. Audio/visual processing module 112 can further determine the degree of synchronization or correspondence between (1) and (2). Combined audio/visual processing module 112 can then input these three factors into a probabilistic model in order to assess whether the trigger phrase (and/or a follow-on query/command phrase) was actually spoken. By way of example, if the trigger phrase was detected as being audibly spoken (by applying a phrase spotting algorithm to the audio captured by microphone 104) and visibly spoken (by reading user lip movements in the video captured by video camera 106) at approximately the same time, module 112 can conclude that the trigger phrase was actually spoken with a relatively high probability, and with greater confidence than through audio-based detection alone. In this way, the accuracy of voice command-and-control system 110 can be significantly improved over conventional approaches.

It should be appreciated that system environment 100 of FIG. 1 is illustrative and not intended to limit embodiments of the present disclosure. For example, the various entities shown in FIG. 1 may be arranged according to different configurations, or may include subcomponents or functions that are not explicitly described. One of ordinary skill in the art will recognize other variations, modifications, and alternatives.

3. Workflows

Figure 2:
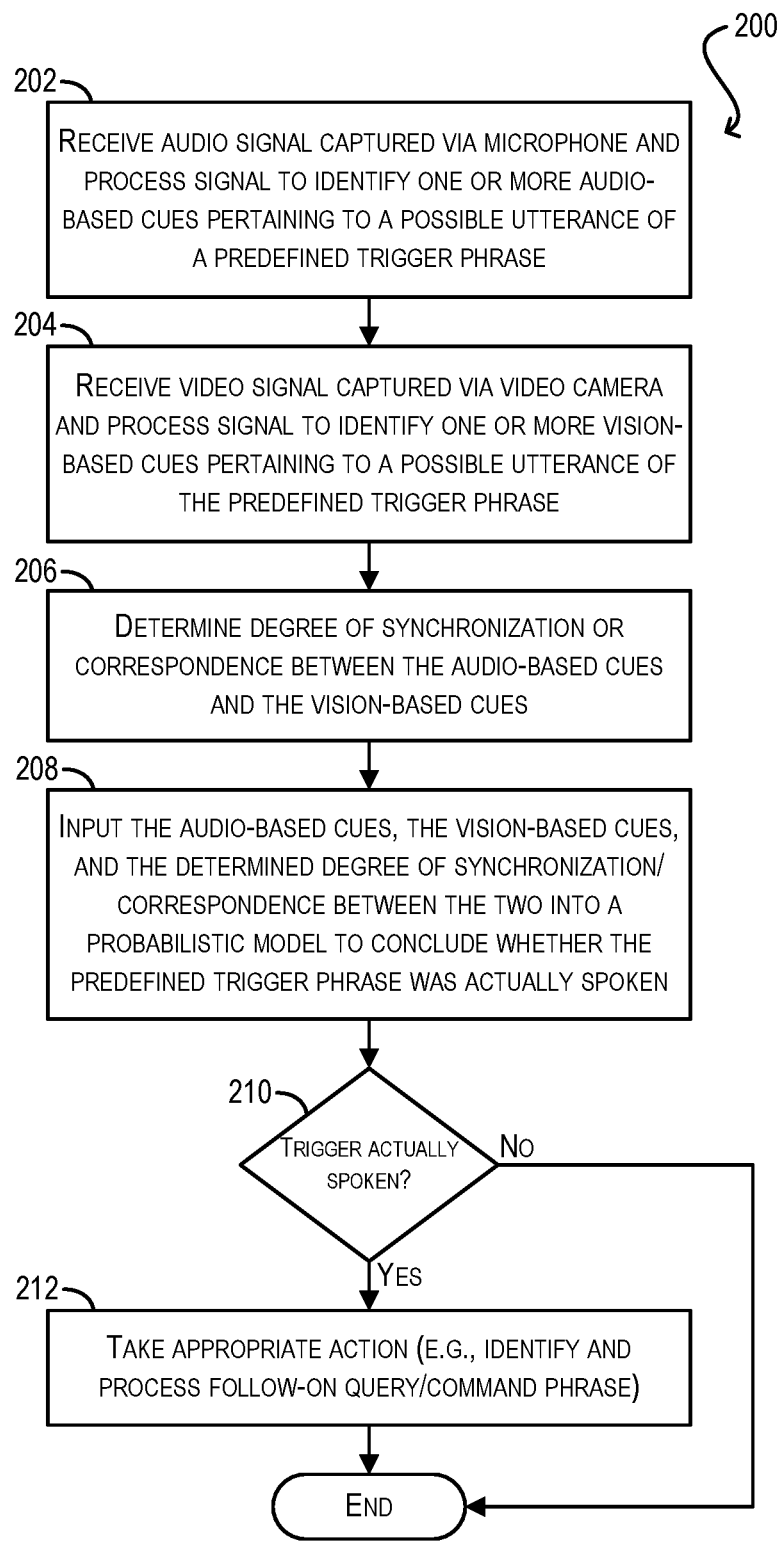
FIG. 2 depicts a first workflow for leveraging both audio and vision-based cues for voice command-and-control according to an embodiment.

FIG. 2 depicts a high-level workflow 200 that can be performed by combined audio/visual processing module 112 of FIG. 1 for leveraging both audio and vision-based cues when monitoring for (i.e., attempting to spot) the utterance of a trigger phrase according to an embodiment.

Starting with block 202, combined audio/visual processing module 112 can receive an audio signal captured via microphone 104 and can process the audio signal to identify one or more audio-based cues pertaining to a possible utterance of a predefined trigger phrase by an individual (e.g., user 108). These audio-based cues can include a determination of whether the trigger phrase was detected as being audibly spoken in the audio signal (via the application of one or more phrase spotting/speech recognition techniques known in the art). The audio-based cues can further include other information such as the sound directionality of the detected phrase, the apparent gender of the speaker (based on aural characteristics of his/her voice), and so on.

Concurrently with (or subsequent to) block 202, combined audio/visual processing module 112 can also receive a video signal captured via video camera 106 and can process the video signal to identify one or more vision-based cues pertaining to a possible utterance of the predefined trigger phrase (block 204). These vision-based cues can include a determination of whether the trigger phrase was detected as being visually spoken in the video signal (by, e.g., detecting face(s) that appear in the video signal and reading the lips of the detected face(s)). The vision-based cues can further include other information such as whether user speaking the phrase was facing camera 106/device 102, the apparent gender of the speaker (based on visual characteristics of her/his face), and so on.

At block 206, combined audio/visual processing module 112 can determine the degree of synchronization or correspondence between the audio-based cues identified at block 202 and the vision-based cues identified at block 204. For example, if the trigger phrase was detected as being audibly spoken at block 202 and detected as being visually spoken at block 204, module 112 can determine whether the audible utterance occurred in synchrony with (i.e., at approximately the same time as) the visual utterance. As another example, if the trigger phrase was detected as being audibly spoken at block 202, module 112 can determine whether anyone was facing camera 106/device 102 at the time of that audible utterance. As yet another example, if the trigger phrase was detected as being audibly spoken at block 202 and detected as being visually spoken at block 204, module 112 can determine whether the audible utterance originated from a direction that corresponds to the location of the user that visually uttered the trigger phrase. As yet another example, if the trigger phrase was detected as being audibly spoken at block 202 and detected as being visually spoken at block 204, module 112 can determine whether the apparent genders of the users that originated the audible and visual utterances match.

Then, at block 208, combined audio/visual processing module 112 can take as input the results of blocks 202, 204, and 206 and can process these inputs using a probabilistic model in order to come to a final conclusion on whether the trigger phrase was actually spoken. For instance, if the trigger phrase was detected as being audibly spoken at block 202 and detected as being visually spoken at block 204, module 112 can assign a higher probability to the outcome that the trigger phrase was actually spoken than if only one of those two detections were made. Further, module 112 can assign a higher probability to the outcome that the trigger phrase was actually spoken if there is a relatively high degree of synchronization or correspondence between the audio and vision-based cues as determined at block 206 (e.g., the audible and visual utterances occurred at the same time and originated from the same direction, the apparent genders of the speakers match, etc.). Other similar rules can be implemented as part of this probabilistic model and will be evident to one of ordinary skill in the art.

Finally, if combined audio/visual processing module 112 concludes that the trigger phrase was actually spoken, module 112 can cause voice command-and-control system 110 to take an appropriate action (blocks 210 and 212). For example, in scenarios where the trigger phrase is followed by a query or command phrase, module 112 can cause voice command-and-control system 110 to identify and process such follow-on phrases. On the other hand, if module 112 concludes that the trigger phrase was not actually spoken, workflow 200 can end (or return to block 202 to process the next segment in the incoming audio/video signals).

It should be appreciated that workflow 200 is illustrative and various modifications are possible. For instance, in some embodiments, the same processing performed at blocks 202-208 with respect to the trigger phrase can also be applied to any follow-on query or command phrase. Thus, in these embodiments, both audio and vision-based cues can be used to increase the accuracy of detecting such follow-on phrases.

Further, in certain embodiments, the audio and vision-based cues described with respect to blocks 202 and 204 can be determined with respect to a follow-on query or command phrase, but used to confirm an utterance of the preceding trigger phrase. An example of such a process is shown in FIG. 3 as workflow 300 according to an embodiment.

Figure 3:
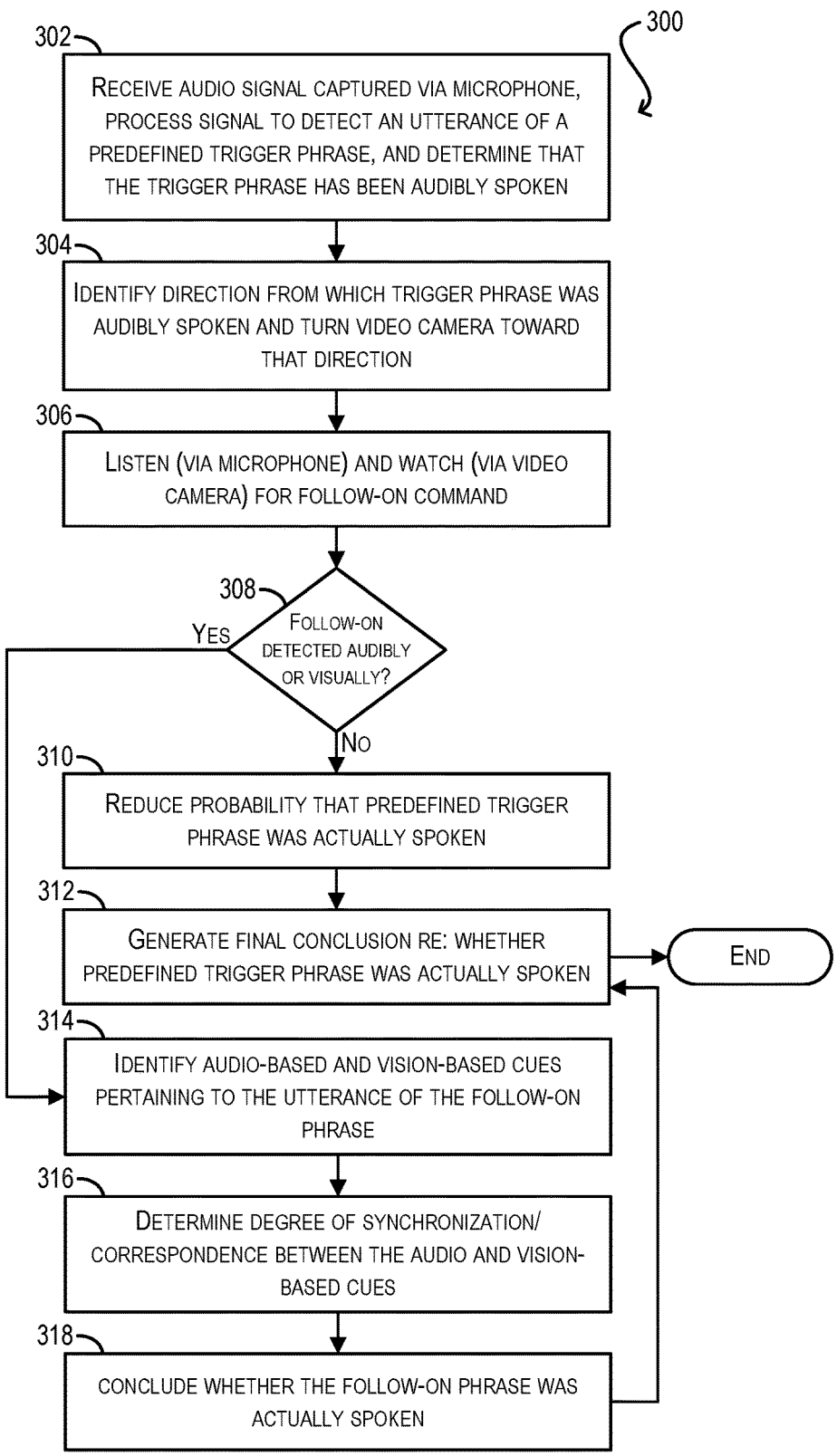
FIG. 3 depicts a second workflow for leveraging both audio and vision-based cues for voice command-and-control according to an embodiment.

At block 302 of FIG. 3, voice command-and-control system 110 can receive an audio signal captured via microphone 104, process the audio signal to detect the utterance of a predefined trigger phrase, and determine that the trigger phrase has been audibly spoken. In response to this determination, system 110 can identify (using, e.g., conventional sound sourcing techniques) the direction from which the trigger phrase was audibly spoken and can turn video camera 106 in that direction (block 304).

Then, at block 306, combined audio/visual processing module 112 can listen (via microphone 104) and watch (via video camera 106) for a follow-on command. If no such command is detected either audibly or visually (block 308), system 110 can reduce the probability that the trigger phrase was in fact spoken (block 310) and can generate a final conclusion regarding the trigger phrase based on this reduction in probability (block 312).

On the other hand, if a follow-on command is detected either audibly or visually at block 308, combined audio/visual processing module 112 can identify audio and vision-based cues pertaining to the detected utterance in a manner similar to blocks 202 and 204 of FIG. 2 (block 314). In addition, module 112 can determine the degree of synchronization or correspondence between the audio and vision-based cues identified at block 314 (block 316). Finally, combined audio/visual processing module 112 can conclude, based on the results of blocks 314 and 316, whether the follow-on phrase was actually spoken (block 318) and can generate a final conclusion regarding whether the trigger phrase was spoken based on the output of block 318 (block 312). For example, if module 112 determines at block 320 that no follow-on command was actually spoken, then the original assessment that the trigger phrase was originally spoken can be reduced in probability. The degree of this reduction can depend on whether the follow-on command was detected solely via audio cues, solely via visual cues, or the degree of synchronization/correspondence between the two.

4. Example Computing Device

Figure 4:
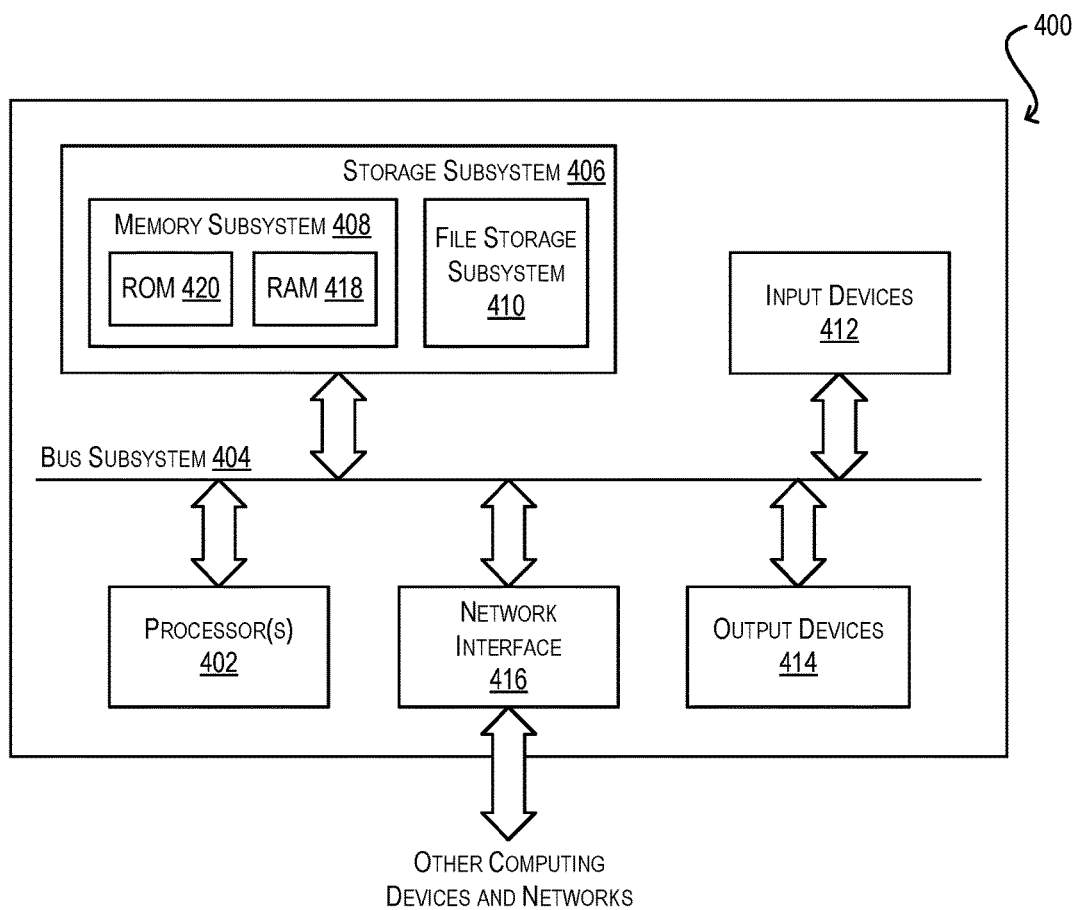
FIG. 4 depicts a computing device according to an embodiment.

FIG. 4 is a simplified block diagram of a computing device 400 that may be used to implement, e.g., device 102 of FIG. 1. As shown, computing device 400 includes one or more processors 402 that communicate with a number of peripheral devices via a bus subsystem 404. These peripheral devices include a storage subsystem 406 (comprising a memory subsystem 408 and a file storage subsystem 410), input devices 412, output devices 414, and a network interface subsystem 416.

Bus subsystem 404 can provide a mechanism for letting the various components and subsystems of computing device 400 communicate with each other as intended. Although bus subsystem 404 is shown schematically as a single bus, alternative embodiments of the bus subsystem can utilize multiple buses.

Network interface subsystem 416 can serve as an interface for communicating data between computing device 400 and other computing devices or networks. Embodiments of network interface subsystem 416 can include wired (e.g., coaxial, twisted pair, or fiber optic Ethernet) and/or wireless (e.g., Wi-Fi, cellular, Bluetooth, etc.) interfaces.

Input devices 412 can include a camera (such as video camera 106 of FIG. 1), a touch-screen incorporated into a display, a keyboard, a pointing device (e.g., mouse, touch-pad, etc.), an audio input device (such as microphone 104 of FIG. 1), and/or other types of input devices. In general, use of the term "input device" is intended to include all possible types of devices and mechanisms for inputting information into computing device 400.

Output devices 414 can include a display subsystem (e.g., a flat-panel display), an audio output device (e.g., a speaker), and/or the like. In general, use of the term "output device" is intended to include all possible types of devices and mechanisms for outputting information from computing device 400.

Storage subsystem 406 includes a memory subsystem 408 and a file/disk storage subsystem 410. Subsystems 408 and 410 represent non-transitory computer-readable storage media that can store program code and/or data that provide the functionality of various embodiments described herein.

Memory subsystem 408 can include a number of memories including a main random access memory (RAM) 418 for storage of instructions and data during program execution and a read-only memory (ROM) 420 in which fixed instructions are stored. File storage subsystem 410 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computing device 400 is illustrative and not intended to limit embodiments of the present invention. Many other configurations having more or fewer components than computing device 400 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted.

Further, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
    identifying, by an electronic device, one or more audio-based cues in a received audio signal that pertain to a possible utterance of a predefined trigger phrase;
    identifying, by the electronic device, one or more vision-based cues in a received video signal that pertain to a possible utterance of the predefined trigger phrase;
    determining, by the electronic device, a degree of synchronization or correspondence between the one or more audio-based cues and the one or more vision-based cues;
    inputting, by the electronic device, the one or more audio-based cues, the one or more vision-based cues, and the degree of synchronization or correspondence into a probabilistic model configured to generate a likelihood that the predefined trigger phrase was actually spoken; and
    if the likelihood generated by the probabilistic model indicates that the predefined trigger phrase was actually spoken:
        processing, by the electronic device, a voice query or command phrase that follows the predefined trigger phrase; and
        returning, by the electronic device, a response to the voice query or command phrase to the user.

2. The method of claim 1 wherein the one or more audio-based cues include a determination that an utterance of the predefined trigger phrase was audibly detected in the received audio signal.

3. The method of claim 2 wherein the one or more audio-based cues further includes a directionality of sound of the audibly detected utterance.

4. The method of claim 3 wherein the one or more audio-based cues further include an indication of gender of a speaker of the audibly detected utterance.

5. The method of claim 1 wherein the one or more vision-based cues include a determination that an utterance of the predefined trigger phrase was visually detected in the received video signal.

6. The method of claim 5 wherein the utterance of the predefined trigger phrase was visually detected by:
    identifying one or more faces in the received video signal; and
    analyzing lip movements of the one or more faces.

7. The method of claim 5 wherein the one or more vision-based cues further include an indication of whether a speaker of the visually detected utterance was facing the electronic device.

8. The method of claim 7 wherein the one or more vision-based cues further includes an indication of gender of the speaker of the visually detected utterance.

9. The method of claim 8 wherein determining the degree of synchronization or correspondence between the one or more audio-based cues and the one or more vision-based cues comprises:
    determining whether the audibly detected utterance occurred at approximately the same time as the visually detected utterance.

10. The method of claim 8 wherein determining the degree of synchronization or correspondence between the one or more audio-based cues and the one or more vision-based cues comprises:
    determining whether the audibly detected utterance originated from a direction that corresponds to a location of the speaker of the visually detected utterance.

11. The method of claim 8 wherein determining the degree of synchronization or correspondence between the one or more audio-based cues and the one or more vision-based cues comprises:
    determining whether the speaker of the visually detected utterance was facing the electronic device at the time of occurrence of the audibly detected utterance.

12. The method of claim 8 wherein determining the degree of synchronization or correspondence between the one or more audio-based cues and the one or more vision-based cues comprises:
    determining whether the gender of the speaker of the audibly detected utterance matches the gender of the speaker of the visually detected utterance.

13. The method of claim 1 wherein the likelihood generated using the probabilistic model is increased if the degree of synchronization or correspondence between the one or more audio-based cues and the one or more vision-based cues is high.

14. The method of claim 1 wherein the likelihood generated using the probabilistic model is decreased if the degree of synchronization or correspondence between the one or more audio-based cues and the one or more vision-based cues is low.

15. The method of claim 1 further comprising, prior to processing the voice query or command phrase:
    identifying one or more additional audio-based cues in the received audio signal that pertain to a possible utterance of the voice query or command phrase;
    identifying one or more additional vision-based cues in the received video signal that pertain to the possible utterance of the voice query or command phrase;
    determining an additional degree of synchronization or correspondence between the one or more additional audio-based cues and the one or more additional vision-based cues; and
    concluding, based on the one or more additional audio-based cues, the one or more additional vision-based cues, and the additional degree of synchronization or correspondence, whether the voice query or command phrase was actually spoken in the received audio and video signals.

16. The method of claim 1 further comprising
    identifying one or more additional audio-based cues in the received audio signal that pertain to a possible utterance of the voice query or command phrase;
    identifying one or more additional vision-based cues in the received video signal that pertain to the possible utterance of the voice query or command phrase;
    determining an additional degree of synchronization or correspondence between the one or more additional audio-based cues and the one or more additional vision-based cues; and modifying, based on the one or more additional audio-based cues, the one or more additional vision-based cues, and the additional degree of synchronization or correspondence, the likelihood that the predefined trigger phrase was actually spoken.

17. A non-transitory computer readable medium having stored thereon program code executable by a processor of an electronic device, the program code comprising:
   code that causes the processor to identify one or more audio-based cues in a received audio signal that pertain to a possible utterance of a predefined trigger phrase;
   code that causes the processor to identify one or more vision-based cues in a received video signal that pertain to a possible utterance of the predefined trigger phrase;
   code that causes the processor to determine a degree of synchronization or correspondence between the one or more audio-based cues and the one or more vision-based cues;
   code that causes the processor to input the one or more audio-based cues, the one or more vision-based cues, and the degree of synchronization or correspondence into a probabilistic model configured to generate a likelihood that the predefined trigger phrase was actually spoken; and
   code that causes the processor to, if the likelihood generated by the probabilistic model indicates that the predefined trigger phrase was actually spoken:
      process a voice query or command phrase that follows the predefined trigger phrase; and
      return a response to the voice query or command phrase to the user.

18. An electronic device comprising:
   a video camera;
   a microphone;
   a processor; and
   a memory having stored thereon program code which, when executed by the processor, causes the processor to:
      identify one or more audio-based cues in a audio signal captured via the microphone that pertain to a possible utterance of a predefined trigger phrase;
      identify one or more vision-based cues in a video signal captured via the video camera that pertain to a possible utterance of the predefined trigger phrase;
      determine a degree of synchronization or correspondence between the one or more audio-based cues and the one or more vision-based cues;
      input the one or more audio-based cues, the one or more vision-based cues, and the degree of synchronization or correspondence into a probabilistic model configured to generate a likelihood that the predefined trigger phrase was actually spoken; and
      if the likelihood generated by the probabilistic model indicates that the predefined trigger phrase was actually spoken
         process a voice query or command phrase that follows the predefined trigger phrase; and
         return a response to the voice query or command phrase to the user.

\* \* \* \* \*